United States Patent
Yoneyama et al.

(10) Patent No.: US 10,855,347 B2
(45) Date of Patent: Dec. 1, 2020

(54) BASE STATION AND TRANSMISSION ANTENNA DECIDING METHOD

(71) Applicant: KYOCERA CORPORATION, Kyoto (JP)

(72) Inventors: Tooru Yoneyama, Kyoto (JP); Sakiko Yamada, Ichinomiya (JP)

(73) Assignee: KYOCERA Corporation, Kyoto (JP)

( * ) Notice: Subject to any disclaimer, the term of this patent is extended or adjusted under 35 U.S.C. 154(b) by 216 days.

(21) Appl. No.: 16/077,402

(22) PCT Filed: Feb. 16, 2017

(86) PCT No.: PCT/JP2017/005783
§ 371 (c)(1),
(2) Date: Aug. 10, 2018

(87) PCT Pub. No.: WO2017/142045
PCT Pub. Date: Aug. 24, 2017

(65) Prior Publication Data
US 2020/0220589 A1    Jul. 9, 2020

(30) Foreign Application Priority Data

Feb. 19, 2016 (JP) .................................. 2016-029745

(51) Int. Cl.
*H04B 7/04* (2017.01)
*H04B 7/0456* (2017.01)
(Continued)

(52) U.S. Cl.
CPC ........... *H04B 7/0456* (2013.01); *H01Q 1/523* (2013.01); *H04B 7/0634* (2013.01);
(Continued)

(58) Field of Classification Search
CPC .. H04B 7/0456; H04B 7/0634; H04B 7/0857; H04B 7/0888; H01Q 1/523; H04W 88/08
See application file for complete search history.

(56) References Cited

U.S. PATENT DOCUMENTS 6,807,405 B1 *  10/2004  Jagger ................. H04B 1/1036
                                                 455/296
7,248,898 B2 *   7/2007  Doi ........................ H01Q 1/246
                                                 342/368
(Continued)

FOREIGN PATENT DOCUMENTS

JP       H07-312590 A    11/1995
JP       2000-151487 A    5/2000
(Continued)

*Primary Examiner* — Jean B Corrielus
(74) *Attorney, Agent, or Firm* — Studebaker & Brackett PC (57) ABSTRACT

A base station according to this disclosure includes a plurality of antennas used for transmission and reception, an adaptive array processing unit that performs adaptive array processing on reception signals received by the plurality of antennas, and a control unit that decides a transmission antenna used for the transmission from the plurality of antennas at a time when a transmission signal is transmitted, and the control unit decides the transmission antenna based on transmission weight vectors respectively corresponding to the plurality of antennas obtained from a processing result of the adaptive array processing unit.

4 Claims, 5 Drawing Sheets

(51) Int. Cl.
*H01Q 1/52* (2006.01)
*H04B 7/06* (2006.01)
*H04B 7/08* (2006.01)
*H04W 88/08* (2009.01)

(52) U.S. Cl.
CPC ......... *H04B 7/0857* (2013.01); *H04B 7/0888* (2013.01); *H04W 88/08* (2013.01)

(56) References Cited

U.S. PATENT DOCUMENTS

| | | | |
|---|---|---|---|
| 8,488,727 B1* | 7/2013 | Feng | H04B 1/707 |
| | | | 375/347 |
| 9,872,295 B2* | 1/2018 | Fukuzono | H04W 16/28 |
| 2001/0049295 A1* | 12/2001 | Matsuoka | H04B 7/086 |
| | | | 455/562.1 |
| 2002/0190901 A1* | 12/2002 | Yoshida | H04B 7/0851 |
| | | | 342/383 |
| 2003/0069047 A1* | 4/2003 | Kitahara | H04B 7/0617 |
| | | | 455/562.1 |
| 2005/0239507 A1* | 10/2005 | Doi | H04B 7/0808 |
| | | | 455/562.1 |
| 2007/0117513 A1* | 5/2007 | Kasami | H04W 16/28 |
| | | | 455/63.4 |
| 2009/0167311 A1* | 7/2009 | Tong | H01Q 3/2605 |
| | | | 324/378 |
| 2013/0176878 A1* | 7/2013 | Lee | H04B 7/0805 |
| | | | 370/252 |

FOREIGN PATENT DOCUMENTS

| | | | |
|---|---|---|---|
| JP | 2003-124854 A | 4/2003 | |
| JP | 2003-283402 A | 10/2003 | |
| JP | 2008-011495 A | 1/2008 | |

* cited by examiner

BASE STATION AND TRANSMISSION ANTENNA DECIDING METHOD

TECHNICAL FIELD

This disclosure relates to a transmission antenna deciding method in a base station that includes a plurality of antennas and transmits and receives a signal using the plurality of antennas.

BACKGROUND ART

In a base station of the background art, an adaptive array method is used (for example, Patent Literature 1). In the base station using the adaptive array method, a reception circuit corresponding to a plurality of antennas and a plurality of transmission circuits corresponding thereto are mounted. In addition, a weight (a reception weight) for each reception circuit is calculated when a signal is received from a communication terminal, and a signal is transmitted from a transmission circuit using the reception weight as a transmission weight.

In the future, since a communication environment is configured so that the base stations are closely disposed in the next generation communication, in order to avoid interference and reduce the cost of the base station manufacturing, reducing antennas that transmit a wireless signal is being examined. For example, a base station including a plurality of reception circuits as in the related art and including only one transmission circuit is being examined. As a method of selecting an antenna at the time of a transmission, for example, as disclosed in Patent Literature 2, a method of selecting an antenna having the highest radio wave strength of a reception signal is general.

CITATION LIST

Patent Literature

[Patent Literature 1]: JP-A-2008-011495
[Patent Literature 2]: JP-A-7-312590

SUMMARY

This disclosure provides a base station and a transmission antenna deciding method capable of reducing an influence of an interference wave when a transmission antenna is selected from a plurality of antennas and capable of performing favorable wireless communication.

A base station according to this disclosure includes a plurality of antennas used for transmission and reception, an adaptive array processing unit that performs adaptive array processing on reception signals received by the plurality of antennas, and a control unit that decides a transmission antenna used for the transmission from the plurality of antennas at a time when a transmission signal is transmitted, and the control unit decides the transmission antenna based on transmission weight vectors respectively corresponding to the plurality of antennas obtained from a processing result of the adaptive array processing unit.

A base station according to this disclosure includes a plurality of antennas used for transmission and reception, an adaptive array processing circuit that performs adaptive array processing on reception signals received by the plurality of antennas, and a control circuit that decides a transmission antenna used for the transmission from the plurality of antennas at a time when a transmission signal is transmitted, and the control circuit decides the transmission antenna based on transmission weight vectors respectively corresponding to the plurality of antennas obtained from a processing result of the adaptive array processing circuit.

A transmission antenna deciding method according to this disclosure includes including a plurality of antennas used for transmission and reception, performing adaptive array processing on reception signals received by the plurality of antennas, deciding a transmission antenna used for the transmission from the plurality of antennas at a time when a transmission signal is transmitted, and deciding the transmission antenna based on transmission weight vectors respectively corresponding to the plurality of antennas obtained from a processing result of the adaptive array processing.

DESCRIPTION OF EMBODIMENTS

Hereinafter, preferable embodiments of this disclosure will be described in detail with reference to the accompanying drawings. The dimensions, materials, specific numerical values, and the like shown in such embodiments are merely examples for facilitating understanding of the invention, and do not limit this disclosure unless otherwise noted. In the specifications and the drawings, elements having substantially the same function and configuration are denoted by the same reference numerals, repetitive descriptions are omitted, and elements that is not directly related to this disclosure are omitted in the drawings.

According to this disclosure, it is possible to provide a base station and a transmission antenna deciding method capable of reducing an influence of an interference wave when a transmission antenna is selected from a plurality of antennas and capable of performing favorable wireless communication.

Figure 1:
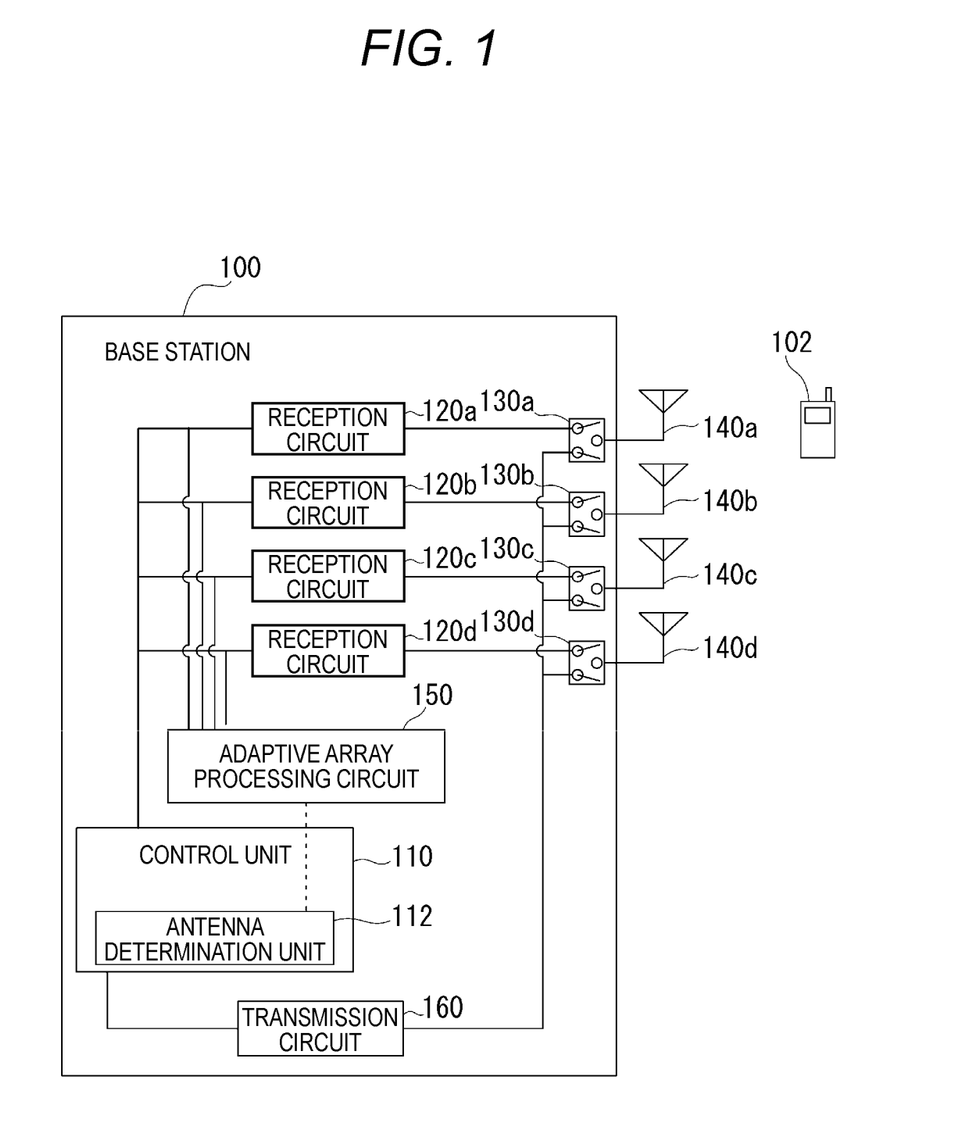
FIG. 1 is a functional block diagram illustrating a configuration of a base station according to the present embodiment.

FIG. 1 is a functional block diagram illustrating a configuration of a base station 100 according to the present embodiment. As shown in FIG. 1, the base station 100 according to the present embodiment includes a plurality (four are illustrated in this disclosure) of antennas 140a • 140b • 140c • 140d performs transmission and reception of (wireless communication) a signal from a wireless terminal 102 using the plurality of antennas 140a to 140d by Time Division Duplex (TDD).

The base station 100 includes a control unit 110. The control unit 110 is constituted by a semiconductor integrated circuit (not shown) including a Central Processing Unit (CPU), and manages and controls the entire base station 100. In the present embodiment, the control unit 110 also functions as an antenna determination unit 112 that will be described later.

The base station 100 includes a plurality (four are illustrated in this disclosure) of reception circuits 120a • 120b • 120c • 120d. Changeover switches 130a • 130b • 130c • 130d are connected to the plurality of reception circuits 120a to 120d, respectively.

The plurality of reception circuits 120a to 120d are connected to the plurality of antennas 140a to 140d through the changeover switches 130a to 130d, respectively. At the time of a reception, reception sides (RX) of all of the changeover switches 130a to 130d are turned on. The reception circuit 120 is able to receive a wireless signal from the antenna 140 corresponding to the changeover switch 130 that is turned on.

An adaptive array processing circuit 150 calculates a transmission weight vector when adaptive array processing is performed on reception signals received by the plurality of antennas 140a to 140d.

The base station 100 further includes one transmission circuit 160. The transmission circuit 160 is connected to the changeover switches 130a to 130d.

The transmission circuit 160 is connected to the antennas 140a to 140d through the changeover switches 130a to 130d. At the time of a transmission, all of reception sides (RX) of the changeover switches 130a to 130d are turned off, and one of a transmission side (TX) is turned on. The transmission circuit 160 is able to transmit a wireless signal to the antenna 140 corresponding to the changeover switch 130 that is turned on.

The antenna determination unit 112 turns on the transmission side (TX) of any one of the changeover switches 130 in order to decide the antenna used for the transmission of the signal by the transmission circuit 160 from the plurality of antennas 140a to 140d.

Figure 2:
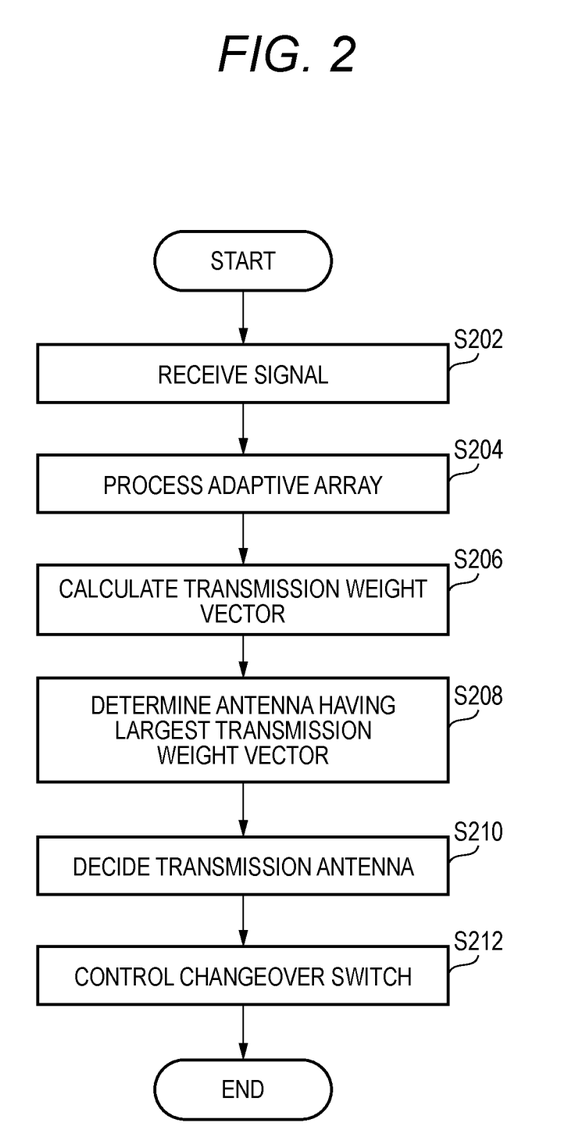
FIG. 2 is a flowchart for describing a transmission antenna deciding method according to a first embodiment.

FIG. 2 is a flowchart for describing a transmission antenna deciding method according to a first embodiment. Hereinafter, the transmission antenna deciding method in the base station 100 will be described while describing an operation of the above-described base station 100 in detail with reference to FIG. 2.

As shown in FIG. 2, in the transmission antenna deciding method of the present embodiment, first, at the time of the reception, the control unit 110 of the base station 100 switches all of the changeover switches 130a to 130d to the reception sides (Rx) and receives the signal from the wireless terminal 102 in the plurality of antennas 140a to 140d (step S202).

The control unit 110 performs the adaptive array processing on the signal received by the plurality of antennas 140a to 140d and the reception circuits 120a to 120d, by the adaptive array processing circuit 150, and calculates the reception weight vectors in each of the antennas 140a to 140d (step S204).

Next, the control unit 110 calculates a transmission weight vector using the reception weight vectors calculated in step S204 in the adaptive array processing circuit 150 (step S206). The reception weight vectors in each of the antennas 140a to 140d may be used as the transmission weight vector.

Specifically, the control unit 110 sets the reception weight vectors of each of the antennas 140a to 140d as the transmission weight vectors W1 • W2 • W3 • W4, respectively. A weight vector is a complex number. In a case where the transmission weight vector $Wn=(xn)+j(yn)$ ($n=1, 2, 3, 4$, $xn$ and $yn$ are real parts and $j$ is an imaginary part) is set, the size thereof $|Wn|$ is calculated by root $((xn)^2+(yn)^2)$. Therefore, sizes of each of the transmission weight vectors W1 • W2 • W3 • W4 are $|W1|, |W2|, |W3|$, and $|W4|$, respectively.

Subsequently, the control unit 110 functioning as the antenna determination unit 112 determines an antenna having the largest value of the transmission weight vectors ($|W1|, |W2|, |W3|$, and $|W4|$) among each of the antennas 140a to 140d (step S208). Since the sizes of the transmission weight vectors are merely compared in step S208, the calculation of the root (square root) is not necessarily required and are able to be omitted in a case where a processing time is required.

Next, the antenna determination unit 112 decides the antenna having the largest value as the antenna used for the transmission (step S210) and controls the changeover switches 130a to 130d so that the decided antenna and the transmission circuit 160 are connected with each other (step S212).

In a base station of the background art, an adaptive array method is used, and a signal is transmitted from a transmission circuit using this reception weight as a transmission weight. In a base station of another background art, a diversity reception is performed rather than the adaptive array method, by using antennas connected to a plurality of reception circuits, respectively. The diversity reception (an antenna diversity) is a method that performs a reception by using a plurality of antennas to perform a switch to an antenna having a good reception state (generally, radio wave strength (RSSI) is large) and a reception circuit. At the time of the transmission, any one antenna is selected and the transmission is performed.

In the antenna selection method at the time of the transmission of the base station performing the diversity reception of the background art, a method of selecting the antenna having the highest radio wave strength of the reception signal is general. However, in a case where an interference wave is present, radio wave strength of the interference wave is added to radio wave strength when the antenna is selected. Therefore, even in a case of the antenna having the highest radio wave strength, the antenna having the highest radio wave strength may not necessarily be an optimum antenna at the time of the transmission in some cases. The base station 100 of the present embodiment improves such a problem and the like.

As described above, according to the base station 100 and the transmission antenna deciding method of the first embodiment, in the base station 100 performing the diversity reception using the plurality of antennas 140a to 140d, the transmission weight vector is used for selecting the transmission antenna. Therefore, it is possible to reduce the influence of the interference wave occurred when the antenna is selected with reference to the radio wave strength as in the background art. Thus, it is possible to provide more stable wireless communication.

Figure 3:
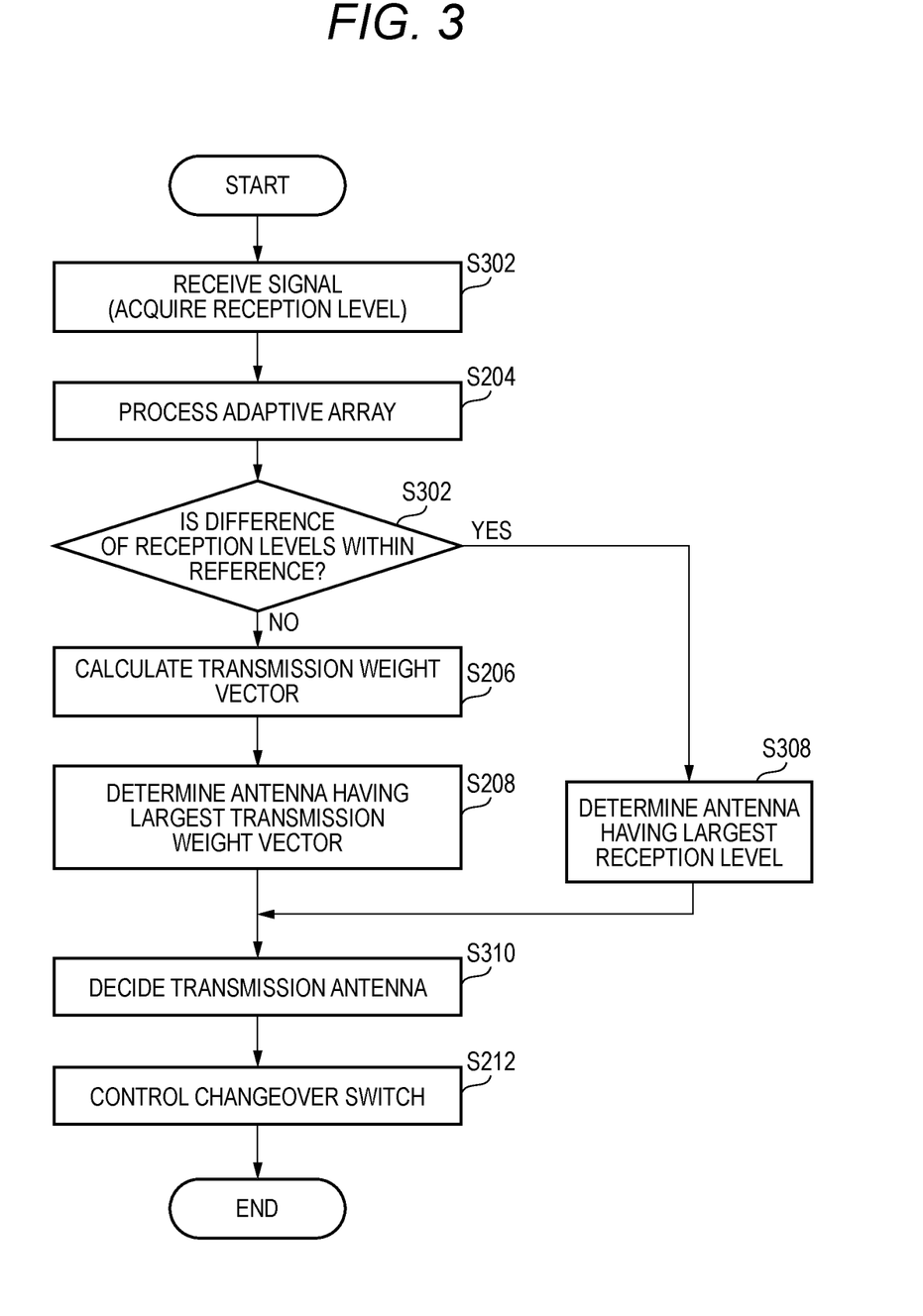
FIG. 3 is a flowchart for describing the transmission antenna deciding method according to a second embodiment.

FIG. 3 is a flowchart for describing a transmission antenna deciding method according to a second embodiment. Hereinafter, the transmission antenna deciding method in the base station 100 will be described while describing the operation of the above-described base station 100 in detail with reference to FIG. 3. The same reference numerals are given to the same operations as those of the transmission antenna deciding method according to the first embodiment.

As shown in FIG. 3, in the transmission antenna deciding method of the present embodiment, first, at the time of the reception, the control unit 110 of the base station 100 switches all of the changeover switches 130a to 130d to the reception sides (Rx) and receives the signal from the wireless terminal 102 in the plurality of antennas 140a to 140d (step S302). At this time, the control unit 110 acquires each reception level (Received Signal Strength Indicator (RSSI)) from each reception circuit 120.

The control unit 110 performs the adaptive array processing on the signal received by the plurality of antennas 140a to 140d and the reception circuits 120a to 120d, by the adaptive array processing circuit 150, and calculates the reception weight vectors in each of the antennas 140a to 140d (step S204).

Next, the control unit 110 calculates a difference between each of the reception levels and determines whether or not all of the differences are within a reference value (step S306). For example, six differences are calculated as follows, and the control unit 110 determines whether or not all of the six differences are within the reference value.

1: The difference between the reception level from the reception circuit 120a and the reception level from the reception circuit 120b 2: The difference between the reception level from the reception circuit 120a and the reception level from the reception circuit 120c 3: The difference between the reception level from the reception circuit 120a and the reception level from the reception circuit 120d 4: The difference between the reception level from the reception circuit 120b and the reception level from the reception circuit 120c 5: The difference between the reception level from the reception circuit 120b and the reception level from the reception circuit 120d 6: The difference between the reception level from the reception circuit 120c and the reception level from the reception circuit 120d In a case where all of the differences are within the reference value, the control unit 110 determines an antenna having the largest reception level among each of the reception levels (step S308).

In a case where all of the differences are not within the reference value, the control unit 110 calculates the transmission weight vector using the reception weight vectors calculated in step S204 in the adaptive array processing circuit 150 (step S206). Since step S206 has been described above, details will be omitted.

Subsequently, the control unit 110 functioning as the antenna determination unit 112 determines the antenna having the largest value of the transmission weight vector among each of the antennas 140a to 140d (step S208).

Next, the antenna determination unit 112 decides the antenna determined in step S208 or step S308 as the antenna used at the time of the transmission (step S310) and controls the changeover switches 130a to 130d so that the decided antenna and the transmission circuit 160 are connected with each other (step S212).

As described above, according to the base station 100 and the transmission antenna deciding method of the second embodiment, the differences between each of the reception levels are referred, and in a case where there is almost no difference between each of the reception levels, the calculation of the transmission vector is stopped. Therefore, processing efficiency of the base station is increased, and thus power consumption can be omitted.

Figure 4:
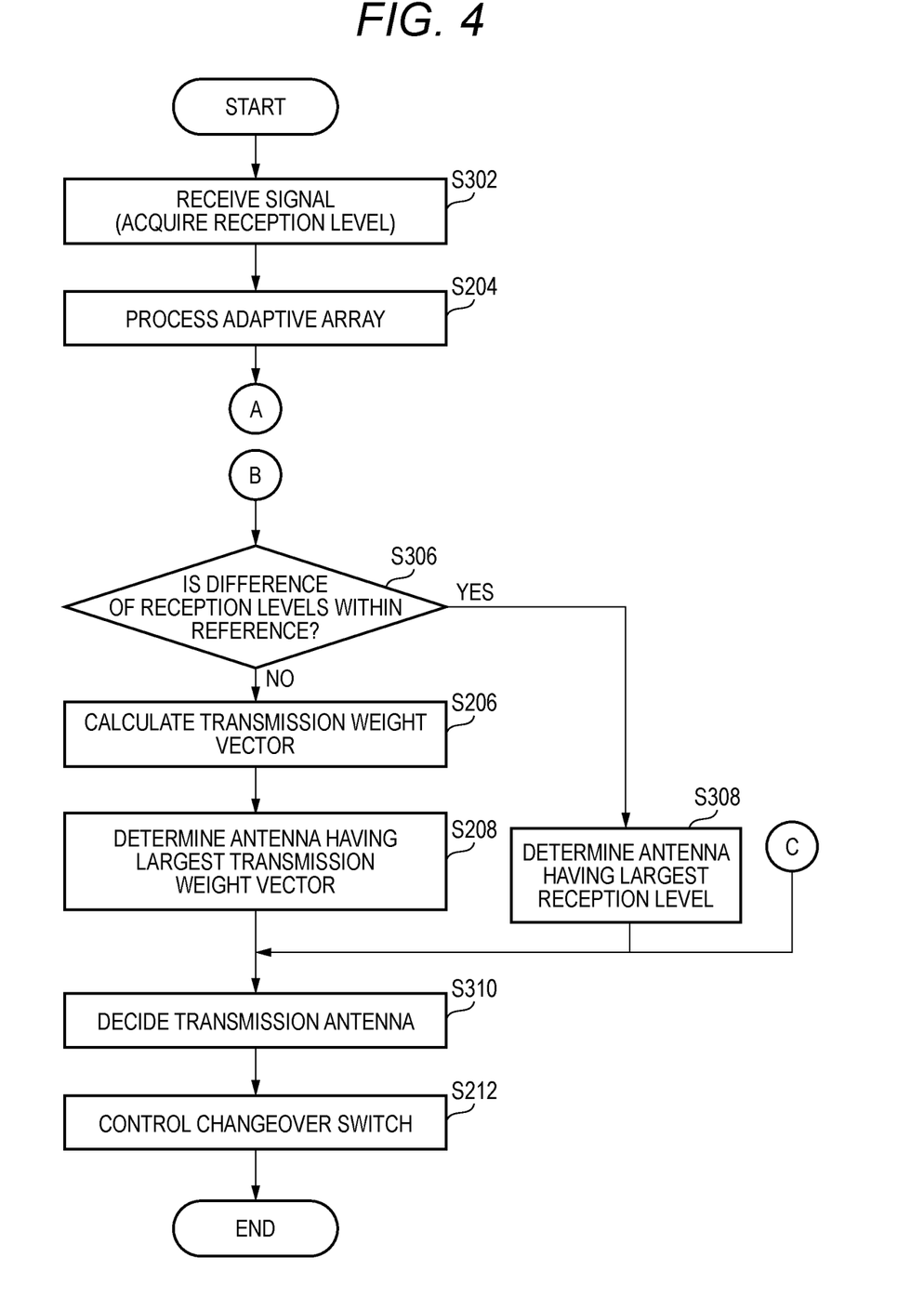
FIG. 4 is a flowchart for describing the transmission antenna deciding method according to a third embodiment.
Figure 5:
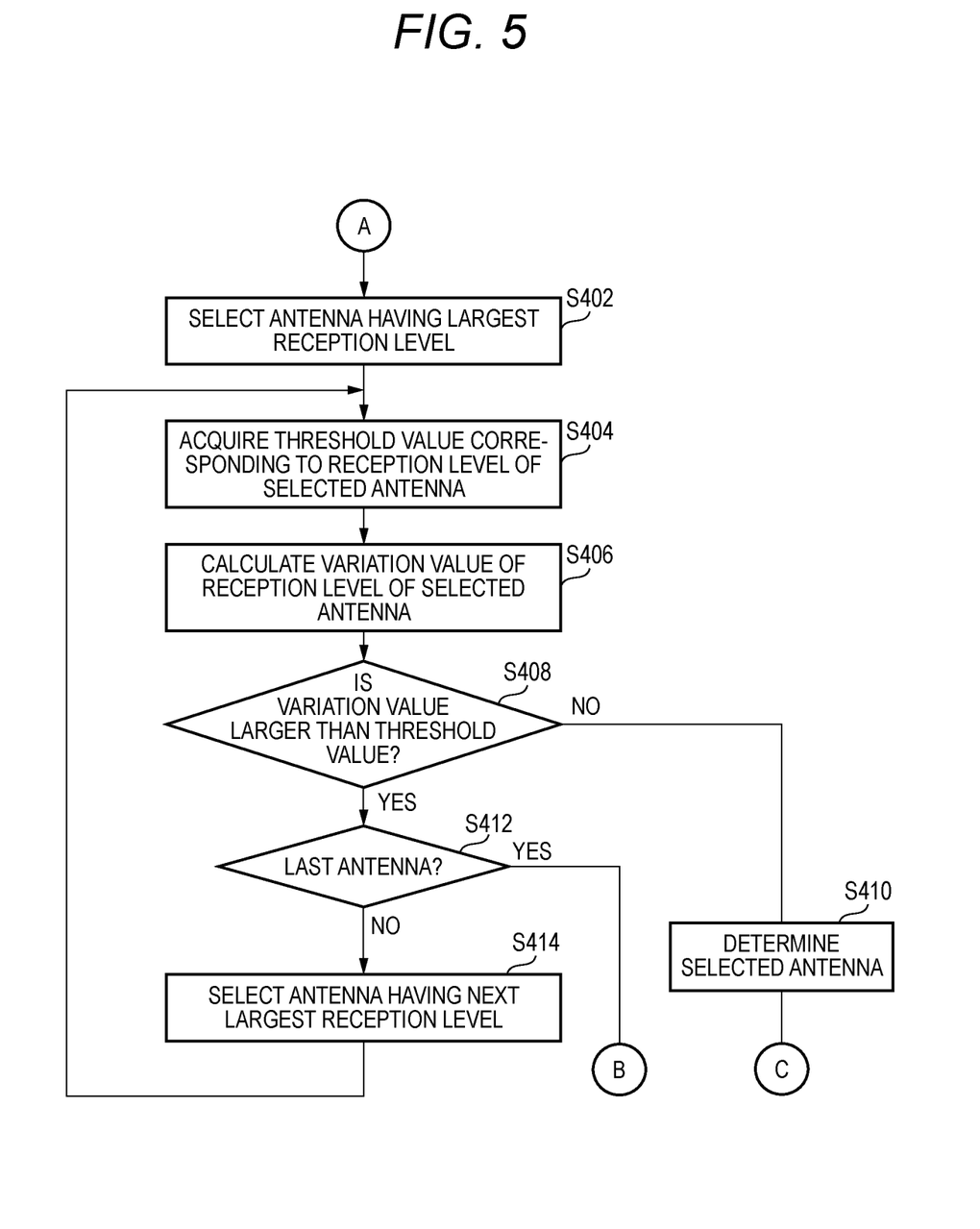
FIG. 5 is a flowchart for describing the transmission antenna deciding method according to the third embodiment.

FIGS. 4 and 5 are flowcharts for describing a transmission antenna deciding method according to a third embodiment. Hereinafter, the transmission antenna deciding method in the base station 100 will be described while describing the operation of the above-described base station 100 in detail with reference to FIGS. 4 and 5. The same reference numerals are given to the same operations as those of the transmission antenna deciding method according to the second embodiment.

As shown in FIG. 4, in the transmission antenna deciding method of the present embodiment, first, at the time of the reception, the control unit 110 of the base station 100 switches all of the changeover switches 130a to 130d to the reception sides (Rx) and receives the signal from the wireless terminal 102 in the plurality of antennas 140a to 140d (step S302). At this time, the control unit 110 acquires each reception level (Received Signal Strength Indicator (RSSI)) from each reception circuit 120.

The control unit 110 performs the adaptive array processing on the signal received by the plurality of antennas 140a to 140d and the reception circuits 120a to 120d, by the adaptive array processing circuit 150, and calculates the reception weight vectors in each of the antennas 140a to 140d (step S204).

As shown in FIG. 5, the control unit 110 selects the antenna 140 having the largest reception level (step S402). Next, the control unit 110 acquires a threshold value corresponding to the reception level of the selected antenna 140 (step S404). The threshold value is a threshold value for determining a situation of a variation of the reception level and is variable by the reception level. For example, the threshold value is a value corresponding to the reception level, a value obtained from a mathematical expression or the like using the reception level as an input, or the like.

Next, the control unit 110 calculates a variation value of the reception level of the selected antenna 140 (step S406). For example, the receptions levels of the signals of each of the antennas 140 during a plurality of previous frames are stored in the base station 100. The variation value may be obtained by a difference between reception levels of a past signal and a present signal of the selected antenna 140, or the variation value may be obtained from changes of a plurality of reception levels in the past. As described below, in a case where the variable value is large, the control unit 110 determines that the control unit 110 is influenced by fading and does not select this antenna 140.

Next, the control unit 110 determines whether or not the variable value is larger than the threshold value (step S408). In a case where the variable value is equal to or less than the threshold value, the control unit 110 determines the selected antenna (step S410) and decides an antenna used at the time of the transmission (FIG. 4: step S310). That is, an antenna that is not influenced by the facing is decided.

In a case where the variable value is larger than the threshold value, the control unit 110 determines whether or not the antenna is the last antenna 140 among the antennas 140 selected in this operation (step S412), and in a case where the antenna is not the last antenna, the control unit 110 selects the antenna 140 having the next largest reception level (step S414). In a case of the last antenna 140 (that is, in a case where it is determined that all of the antennas 140 receive the fading), the control unit 110 advances the operation from step S306 of FIG. 4.

In a case where an antenna having a remarkably low reception level is selected as the transmission antenna although the variation of the reception level is small, since there is a possibility that wireless communication quality is deteriorated, the threshold value for determining the variation of the reception level is variable based on such an antenna having the low reception level.

While preferred embodiments of this disclosure have been described with reference to the accompanying drawings, it is needless to say that this disclosure is not limited to such examples. Those skilled in the art will appreciate that various modifications or corrections can be conceived within the scope described in the claims and it should be understood that they naturally belong to the technical scope of this disclosure.

This application is based upon and claims the benefit of priority from Japanese Patent Application No. 2016-029745, filed Feb. 19, 2016, the entire contents of which are incorporated herein by reference.

INDUSTRIAL APPLICABILITY

This disclosure can be used in a base station that transmits and receives a signal using a plurality of antennas, a plurality of reception circuits, and one transmission circuit, and a transmission antenna deciding method in the base station.

REFERENCE SIGNS LIST

100: base station
102: wireless terminal
110: control unit
112: antenna determination unit
120$a$: reception circuit
120$b$: reception circuit
120$c$: reception circuit
120$d$: reception circuit
130$a$: changeover switch
130$b$: changeover switch
130$c$: changeover switch
130$d$: changeover switch
140$a$: antenna
140$b$: antenna
140$c$: antenna
140$d$: antenna
150: adaptive array processing circuit
160: transmission circuit

The invention claimed is:

1. A base station comprising:
a plurality of antennas used for transmission and reception;
an adaptive array processing circuit that performs adaptive array processing on reception signals received by the plurality of antennas; and
a control circuit that decides a transmission antenna used for the transmission from the plurality of antennas at a time when a transmission signal is transmitted, wherein
the control circuit decides the transmission antenna based on transmission weight vectors respectively corresponding to the plurality of antennas obtained from a processing result of the adaptive array processing circuit, wherein
in a case where a difference between each of reception levels when the reception is performed by the plurality of antennas is within a reference, the control circuit decides an antenna corresponding to a largest reception level among each of the reception levels as the transmission antenna.

2. The base station of claim 1, wherein
the base station receives the reception signals by a diversity reception using the plurality of antennas, and
the control circuit decides one of the plurality of antennas as the transmission antenna.

3. The base station of claim 1, further comprising:
a plurality of reception circuits corresponding to the plurality of antennas, respectively; and
one transmission circuit connected to any one of the plurality of antennas.

4. A transmission antenna deciding method in a base station including a plurality of antennas used for transmission and reception, the transmission antenna deciding method comprising:
performing adaptive array processing on reception signals received by the plurality of antennas;
deciding a transmission antenna used for the transmission from the plurality of antennas at a time when a transmission signal is transmitted; and
deciding the transmission antenna based on transmission weight vectors respectively corresponding to the plurality of antennas obtained from a processing result of the adaptive array processing, wherein
deciding the transmission antenna includes:
in a case where a difference between each of reception levels when the reception is performed by the plurality of antennas is within a reference, deciding an antenna corresponding to a largest reception level among each of the reception levels as the transmission antenna.

* * * * *